United States Patent [19]
Gapud et al.

[11] Patent Number: 6,001,925
[45] Date of Patent: Dec. 14, 1999

[54] MELAMINE-FORMALDEHYDE RESINS MODIFIED WITH DICYANDIAMIDE AND SORBITOL FOR IMPREGNATION OF SUBSTRATES FOR POST-FORMABLE DECORATIVE LAMINATES

[75] Inventors: Benjamin D. Gapud, Lawrenceville; Mary K.A. Shoemake, Conyers; Eric A. Searcy, Lithonia, all of Ga.

[73] Assignee: Georgia-Pacific Resins, Inc., Atlanta, Ga.

[21] Appl. No.: 09/006,889

[22] Filed: Jan. 14, 1998

[51] Int. Cl.$^6$ ............................................. C08K 3/20
[52] U.S. Cl. .......................... 524/598; 442/160; 428/530
[58] Field of Search ........................ 524/598; 442/160; 428/530

[56] References Cited

U.S. PATENT DOCUMENTS

| | | |
|---|---|---|
| 3,194,720 | 7/1965 | Grudus et al. . |
| 3,832,316 | 8/1974 | Juneja . |
| 4,410,652 | 10/1983 | Robinson . |
| 4,439,208 | 3/1984 | Moser et al. . |
| 4,511,707 | 4/1985 | Runyon et al. . |
| 4,764,585 | 8/1988 | Heller et al. . |
| 5,298,186 | 3/1994 | Mitchell et al. . |
| 5,346,937 | 9/1994 | Kuchler et al. . |

FOREIGN PATENT DOCUMENTS

| | | |
|---|---|---|
| 1005822 A3 | 2/1994 | Belgium . |
| 95/11022 | 12/1995 | South Africa . |
| 96/20230 | 7/1996 | WIPO . |

*Primary Examiner*—Christopher Raimund
*Attorney, Agent, or Firm*—Banner & Witcoff, Ltd.

[57] ABSTRACT

Modified melamine-formaldehyde resins prepared by reacting melamine with formaldehyde at a F:M molar ratio in the range of about 1.55:1–2.5:1 under alkaline conditions, wherein the resin is prepared in the presence of about 1–10 wt % dicyandiamide and about 1–10 wt % sorbitol based on the total weight of resin solids. The resins are used to impregnate substrates in the preparation of decorative laminates. The laminates can be used to produce, for example, furniture, countertops or flooring.

15 Claims, No Drawings

MELAMINE-FORMALDEHYDE RESINS MODIFIED WITH DICYANDIAMIDE AND SORBITOL FOR IMPREGNATION OF SUBSTRATES FOR POST-FORMABLE DECORATIVE LAMINATES

FIELD OF THE INVENTION

The present invention relates to dicyandiamide and sorbitol alkaline melamine-formaldehyde resins for impregnation of substrates such as paper for decorative laminates and to methods of making the resins and laminates. The laminates can be used to produce, for example, furniture, countertops or flooring.

BACKGROUND OF THE INVENTION

Because of their excellent color, hardness, and solvent, water, and chemical resistance, melamine resins are often used in the saturation of decorative and overlay paper for the preparation of decorative laminates. They are also resistant to heat and abrasion. There are many patents describing the use of melamine resins in these applications. Unfortunately, unmodified melamine resins have very short shelf lives, e.g., no more than about 1–3 days, after which time resin begins to separate from solution. Consequently, such resins must be used shortly after their preparation, and unexpected scheduling disruption can lead to loss of product. Laminates produced from such unmodified melamine resins also tend to be very brittle and normally cannot be post-formed to produce clear, crack-free surfaces.

The art has recognized that many of the shortcomings of unmodified melamine resins can be addressed by the introduction of various resin modifiers. Modifiers are available for increasing the shelf life of melamine resins, for increasing flow during processing, for increasing the cured resin's flexibility, and/or for increasing post-formability of a laminated product. Often, a plasticizer is added to melamine formulations to improve shelf life and to aid post-formability. Plasticizers which have been used in this regard include sucrose, sorbitol, alkylguanamines, aliphatic polyols, aromatic amides, aromatic amines, polyvinyl alcohol, monocarbamates, caprolactam, and isocyanurates. U.S. Pat. No. 3,716,395, for example, describes a laminated material which contains, inter alia, a coating layer comprised of, for example, melamine- and/or urea-formaldehyde resins, a pigment, and a plasticizer, such as a mixture of sugar and sorbitol.

There are many patents directed to modified melamine resins. For instance, U.S. Pat. No. 3,832,316 discloses aqueous resin solutions formed by partially reacting formaldehyde, melamine, and dicyandiamide in the presence of an oxy-acid of phosphorous. U.S. Pat. No. 3,194,720 describes laminating resins for producing rigid and decorative post-formable laminates. The resins comprise the co-condensation product of an aminotriazine, such as melamine, and an aldehyde. An anhydride of sorbitol is also included to enhance the stability of the aqueous resin solution. U.S. Pat. No. 5,346,937 relates to melamine resins modified by dicyandiamide, a water soluble starch, and a guanamine derivative which resins are useful for decorative paper laminates.

WO 96/20230 discloses resins for use in post-formed laminates prepared by reacting formaldehyde, melamine, dicyandiamide, and a polyol such as trimethylolpropane, 1,4-cyclohexanedimethanol, or 1,6-hexanediol. BE 1005822 A3 discloses melamine-formaldehyde resins modified with dicyandiamide. The resins are useful for impregnation of paper for making laminates.

Unfortunately, the steps taken by the prior art to improve post-formability often create laminates whose color, clarity, or chemical and water resistance are adversely affected. For instance, sugar-modified melamine-formaldehyde resins often yellow when subjected to heat and pressure as the laminate is cured. Other modifiers in the prior art also reduce the boiling water resistance of the cured laminate while increasing the flexibility of the laminate. Still other modifiers reduce the shelf life of the resin or reduce the flexibility and gloss characteristics of the final laminate to unacceptable levels.

It was thus desired to obtain a modifier for melamine resins which does not have the disadvantages of the prior art modifiers, improves resin storage stability, and confers good flexibility and gloss to the cured laminates.

SUMMARY OF THE INVENTION

The present invention is directed to the combined use of dicyandiamide with sorbitol as a modifier for melamine laminating resins used in producing post-formable decorative laminates. The modified melamine resin in accordance with the present invention exhibits good storage stability in solution and confers good flexibility and gloss properties to the laminates.

The present invention specifically is directed to a melamine-formaldehyde resin prepared by reacting melamine (M) with formaldehyde (F) at a F:M molar ratio in the range of about 1.55:1–2.5:1 under alkaline conditions, wherein the resin is prepared in the presence of about 1–10 wt % dicyandiamide and about 1–10 wt % sorbitol based on the total weight of resin solids (combined weight of melamine and pure formaldehyde).

The present invention is also directed to a method of making a modified melamine-formaldehyde resin comprising reacting melamine with formaldehyde at a F:M molar ratio in the range of about 1.55:1–2.5:1 under alkaline conditions and in the presence of about 1–10 wt % dicyandiamide and about 1–10 wt % sorbitol based on the total weight of resin solids.

The present invention is further directed to a decorative laminate comprising a substrate impregnated with a modified melamine-formaldehyde resin as defined above, and also to a process for producing a decorative laminate comprising impregnating a substrate with the modified melamine-formaldehyde resin, pressing the substrate to form a laminate, optionally partially curing the laminate, and then post-forming the laminate.

It is to be understood that both the foregoing general description and the following detailed description are exemplary and explanatory only, and are not restrictive of the present invention as claimed.

DETAILED DESCRIPTION OF THE INVENTION

In accordance with a preferred practice of the present invention for making the modified melamine-formaldehyde resin, melamine is reacted with formaldehyde in a conventional manner under alkaline conditions. Dicyandiamide and sorbitol are admixed with the melamine and formaldehyde at an appropriate mole ratio before initiating or during the melamine-formaldehyde reaction. The dicyandiamide and sorbitol are present during methylolation and subsequently during condensation, hence modifying the resulting melamine-formaldehyde resin.

The dicyandiamide and sorbitol may be added in the noted amount individually or as a mixture. The resin of the present invention may also be prepared using a ready-prepared mixture containing an appropriate relative molar amount of melamine and formaldehyde, and the proper weight percent of dicyandiamide and sorbitol.

Water is added before, during, or after the resin synthesis reaction is complete so that the resin solution contains about 40–60% solids, preferably 45–55% solids. Preferably, the monomer mixture is allowed to react at a temperature held between about 90° C. and 120° C., until a final water tolerance of 200–400% by volume is reached. Water tolerance is the amount of water that can be added to a resin solution at 25° C. until a point is reached that resin precipitates out. The resin at this water tolerance is stable for at least 6–10 weeks at 25° C.

The modified melamine-formaldehyde resin of this invention is produced with a formaldehyde to melamine molar ratio in the range of about 1.55:1–2.5:1, preferably in the range of about 1.6:1 to 1.7:1. The resin is modified with about 1–10 wt %, preferably about 3 to 5 wt %, dicyandiamide, and about 1–10 wt %, preferably about 1 to 5 wt %, sorbitol.

Optionally about 1–10 wt %, preferably about 1 to 3 wt %, of an alkylene glycol based on the total weight of resin solids is added to the resin after condensation. Suitable alkylene glycols include, but are not limited to, ethylene glycol, diethylene glycol, and propylene glycol. Preferably, diethylene glycol is used.

Although melamine is specifically mentioned for use in the practice of this invention, and is generally preferred, the melamine may be partially or totally replaced with other suitable amine-containing compounds. Other suitable compounds include urea, thiourea, dicyandiamide, melem, melam, melon, ammeline, ammelide, substituted melamines, guanamines, or mixtures thereof Substituted melamines include the alkyl melamines and aryl melamines which can be mono-, di-, or tri-substituted. In the alkyl-substituted melamines, each alkyl group can contain from 1 to 6 carbons, preferably from 1 to 4 carbons. Representative examples of some alkyl-substituted melamines are monomethylmelamine, dimethyl melamine, trimethyl melamine, monoethyl melamine, and 1-methyl-3-propyl-5-butyl melamine. In the aryl-substituted melamines, each aryl group can contain 1–2 phenyl moieties and, preferably, 1 phenyl moiety. Typical examples of an aryl-substituted melamine are monophenyl melamine or diphenyl melamine. Based on considerations of cost and availability, standard melamine is generally preferred.

The guanamines which can be employed in the practice of this invention can be of any of the cycloaliphatic guanamines. Preferably, the cycloaliphatic guanamines should not contain more than 15 carbon atoms. Typical examples of some cycloaliphatic guanamines are tetrahydrobenzoguanamine, hexahydrobenzoguanamine, 3-methyl-tetrahydrobenzoguanamine, 3-methyl-hexahydrobenzoguanamine, 3,4-dimethyl-1,2,5,6-tetrahydrobenzoguanamine, and 3,4-dimethylhexahydrobenzoguanamine and mixtures thereof A preferred cycloaliphatic guanamine is tetrahydrobenzoguanamine. Other guanamines which might be used include acetoguanamine, formoguanamine, or benzoguanamine. Mixtures of aminotriazine compounds also are contemplated such as a mixture of melamine and an alkyl substituted melamine and a cycloaliphatic guanamine, such as tetrahydrobenzoguanamine.

Formaldehyde can be used alone or in combination with a variety of other aldehydes or their equivalents heretofore employed in the formation of melamine resins including, for example, acetaldehyde, propionaldehyde, butylaldehyde, furfuraldehyde, benzaldehyde, acrolein, methacrolein, and crotonaldehyde. In general, the aldehydes employed have the general formula R'CHO, wherein R' is a hydrogen or hydrocarbon moiety generally containing from 1 to 8 carbon atoms. Formaldehyde is preferred in most applications. Formaldehyde can be supplied in any one of its commonly available forms, including formalin solutions and paraformaldehyde. Formaldehyde is generally used as an aqueous formalin solution at a concentration of 30–50% by weight.

As used herein, the phrase "under alkaline conditions" with reference to the reaction mixture means a pH of between about 7 and 11, preferably between about 8.5 and 10.5 and, more preferably, between about 9.0 and 9.5. The alkaline condition for synthesizing the modified melamine-formaldehyde resin may be achieved simply by adding a base to an aqueous mixture to obtain the desired pH. Suitable bases include, but are not limited to, alkali metal hydroxides, such as sodium, lithium, or potassium hydroxide. Other bases include alkali metal carbonates, such as sodium carbonate and potassium carbonate, alkaline earth hydroxides, such as magnesium hydroxide, calcium hydroxide and barium hydroxide, aqueous ammonia, and amines, such as triethanolamine. Preferably caustic soda (sodium hydroxide) is used.

Additives typically used in preparing melamine-formaldehyde laminating resins also may be added to a previously prepared resin of the invention, for example fire retardants, pigments, extenders, fillers, catalysts, and the like. It is well known to those skilled in the art to add appropriate additives, as required, to improve particular laminate properties.

When preparing laminates employing the resins of this invention, it may be desirable to add a catalyst or cure accelerator to the modified resin in order to aid in the curing process. Common catalysts include inorganic acids, e.g., sulfuric, hydrochloric, phosphoric, boric, etc.; organic acids and anhydrides, e.g., acetic, tartaric, benzoic, propionic, adipic, oxalic, fumaric acids, hexachloric phthalic anhydride, maleic anhydride, etc. Other catalysts which can be employed are those which liberate an acid when heated. Such catalysts include the amine salts of organic and inorganic acids, such as ethylene sulfite, the hydrochloric acid salt of 2-amino-2-methyl propanol, the hydrochloric acid salt of mono-, di-, or triethanol amine, the hydrochloric acid salt of 2-dimethylamino-2-methyl propanol, the amine salts of para-toluene sulfonic acid, the chloroacetic acid salt of pyridine, the triammonium acid pyrophosphate salt of aminomethyl propanol, and the phosphoric acid salt of 2-dimethylamino-2-methyl propanol. Other catalysts include the inorganic salts of inorganic acids, such as ammonium chloride, magnesium chloride, zinc chloride, etc. The catalyst system might also include mixtures of the aforementioned catalysts.

Catalysts are added in an amount from about 0.1 to 10 wt %, preferably about 0.1 to 1.5 wt % and, most preferably, about 0.2 wt %, based on the resin solids. The catalyst may be added into the reaction vessel upon conclusion of the resin synthesis or to the laminating syrup up to immediately prior to preparation of a laminate.

Methods, techniques and equipment for preparation of decorative laminates are well known to those skilled in the art, and need not be described in detail. In general, a generally porous substrate, such as paper or a fabric web, is impregnated with a solution of the modified melamine resin and dried (B-staged). The dried resin impregnated substrate, along with other layers, is pressed usually with heat to form a laminate. At this point, the laminate may be only partially cured. Thereafter, the laminate may be post-formed and cured completely.

A typical decorative laminate is prepared from (1) a rigid substrate, (2) a melamine resin impregnated decorative substrate, and, in some cases (3) a melamine resin impregnated overlay sheet. In such decorative laminates, the rigid substrate may consist of any suitable material, such as particle board, a resin-binded wood fiberboard, a plurality of phenolic resin-impregnated sheets, etc. These composites are heated under high pressure to form a single component which can be incorporated into furniture, used on countertops or flooring, etc.

The amount of resin solids incorporated into these laminates varies from 30% to 80% based on the weight of the total laminate, and typically depends as understood by those skilled in the art on the type of application and the type of materials used to make the laminate. The lower percentages are generally used for decorative substrates such as decorative print sheets and the higher amounts are used in overlay sheets. After the substrate is impregnated with the aqueous resin, it is dried to a suitable volatile content (B-staged) and the substrates and sheets then are assembled into a laminate between two pressing plates. A laminate is then formed in this fashion under a specific pressure (generally 1000–2000 psi) and temperature (generally 250–350° F.) for periods of 5 to 45 minutes. A. laminate made in this manner must then pass several physical tests, including post-formability and resistance to boiling water.

EXAMPLES

The invention will be further described by reference to the following examples. These examples should not be construed in any way as limiting the invention:

Example 1

Melamine and formaldehyde were reacted by combining 36 parts of melamine crystals with 29 parts of a 50% formaldehyde solution in the presence of 0.1 part of a 50% caustic solution, 28 parts water, 4 parts dicyandiamide, and 1 part sorbitol. The aqueous mixture had a pH of 9.2. The mixture of reactants was heated to a temperature of 100° C. and held at that temperature until it turned water clear. The mixture then was cooled to 85° C. and was reacted further until obtaining a resin sample having a water tolerance of a 1.8 parts water to 1.0 part resin. The resin turned cloudy when the indicated ratio of water was mixed at 25° C. Then, the resin was cooled to 25° C. and a final pH adjustment was made with caustic soda to a pH of 10.0.

Example 2

Twenty-nine parts of a 50% formaldehyde solution was diluted with 28.4 parts water, and the pH of the solution was raised to 9.2 with a 50% sodium hydroxide solution. To the alkaline formaldehyde solution was then added 36 parts melamine, 1 part sorbitol, and 4 parts dicyandiamide. Next, the mixture was heated to a temperature of 110° C. and held at that temperature until the solution cleared. At this point, the temperature of the solution was reduced to 94° C. and held at 94° C. until an ice hydrophobe was reached. Resin is added to ice-water mixture and hydrophobe is detected when the added resin turns milky. Before hydrobe, resin stays clear. The temperature then was decreased further to 85° C. and held for about 45 minutes at which time the resin exhibited a water tolerance of 180%. (The water tolerances is the amount of water that can be added to a resin solution at 25° C. before precipitation of the resin occurs.) Once the resin had reached the specified water tolerance, the reaction temperature was reduced rapidly to 25° C. During cool down to below 60° C., 1.0 part diethylene glycol was added to the reaction mixture. The final pH of the resin was adjust to 10.0 with a 50% solution of sodium hydroxide. The solids content of the resin solution was determined (105° C. for 3 h) to be 55%.

Example 3

To illustrate the outstanding storage stability of the resin prepared in Example 2, the water tolerance of two samples of the resin stored under different conditions was recorded as a function of time. One sample was stored at 25° C. and the other at 15° C. The storage stability of the modified resin was then compared directly to that of commercial melamine-formaldehyde resin (GP 4855) prepared at a F:M mole ratio of 1.34:1 and modified with acetoguanamine and toluene sulfonamide. (Stability is defined as the length of time a resin is capable of remaining water clear) Reported below are the number of days the designated resins remained stable at the specified temperature.

TABLE I

Storage Stability Data for Melamine-Formaldehyde Formulations

| Storage Temperature | Ex. 2: Inventive MF resin | Control-Standard MF Resin |
|---|---|---|
| 15° C. | 21 days | 2 days |
| 25° C. | 72 days | 6 days |

Example 4

Manufacturing of the High-Pressure Decorative Laminates

Overlay/colored paper was saturated with pre-catalyzed melamine-formaldehyde resin by dipping and subsequently passing through squeeze-off rolls. The moist prepreg was then dried by heating at 150° C. for 5–10 minutes to give a flexible, slightly tacky B-staged material with 4 to 6% volatile content by weight. (The volatile content was determined by placing, a sample of the precured material in an oven for 5 minutes at 160° C. and measuring the loss in weight which resulted during this time.) The B-staged overlay/colored paper then was placed onto a decorative sheet as needed and a stack of phenol-formaldehyde impregnated core sheets. The material was then pressed in a hot press under 1000 psi at 270° F. for 15 minutes during which time it was reacted completely to give a flexible laminate.

Example 5

Post-formability, Blister Resistance, Boiling Water Resistance, and High-Temperature Resistance Data To illustrate the superior post-formability and blister resistance of the dicyandiamide/sorbitol-modified melamine-formaldehyde resin prepared in Example 2, a series of laminates were manufactured according to the method of Example 4 using two different colored paper sources including solid black and solid red. Once the laminates were constructed, they were evaluated based on standardize NEMA test methods. The data from this study was then compared directly to that obtained for laminates treated with a standard unmodified melamine-formaldehyde resin.

NEMA testing results for both resins are shown in Table II below.

TABLE II

NEMA Test Results for Manufactured Laminates

| | NEMA Test # | | | |
|---|---|---|---|---|
| | 3.15 | 3.14 | 3.6 | 3.5 |
| Test Method | Blister Resistance, sec/° F. | Formability, ⅝-inch radial bend, ° F. min. temp | Boiling Water Resistance 212° F. | High-Temperature Resistance, 365° F. |
| Paper: Solid Black Color | | | | |
| Control, Standard MF Resin | 49/431 | 300 | Pass | Pass |
| Inventive MF Resin | 50/431 | 275 | Pass | Pass |
| Paper: Solid Red Color | | | | |
| Control, Standard MF Resin | 70/435 | 275 | Pass | Pass |
| Inventive MF Resin | 74/438 | 225 | Pass | Pass |

The inventive resin performed as well as or better than the control resin. In particular, the inventive resin was superior to the control resin in post-formability.

It will be apparent to those skilled in the art that numerous modifications and variations can be made in the compositions and methods of the present invention without departing from the spirit or scope of the invention. Thus, it is intended that the present invention cover the modifications and variations of this invention provided they come within the scope of the appended claims and their equivalent.

What is claimed is:

1. A modified melamine-formaldehyde resin prepared by reacting melamine with formaldehyde at a F:M molar ratio in the range of about 1.55:1–2.5:1 under alkaline conditions, wherein the resin is prepared in the presence of about 1–10 wt % dicyandiamide and about 1–10 wt % sorbitol based on the total weight of resin solids.

2. The resin of claim 1 wherein about 1–10% of an alkylene glycol based on the total weight of resin solids is added to the resin.

3. The resin of claim 2 wherein the alkylene glycol is diethylene glycol.

4. The resin of claim 1 wherein the F:M molar ratio is about 1.6:1–1.7:1.

5. The resin of claim 1 wherein said sorbitol is present in an amount of about 1 to 5 wt % based on the total weight of resin solids.

6. The resin of claim 1 wherein said dicyandiamide is present in an amount of about 3 to 5 wt % based on the total weight of resin solids.

7. The resin of claim 2 wherein said alkylene glycol is present in an amount of about 1 to 3 wt % based on the total weight of resin solids.

8. The resin of claim 1 having a water tolerance between about 200 and 400% by volume.

9. A method of making a modified melamine-formaldehyde resin comprising reacting melamine with formaldehyde at a F:M molar ratio of about 1.55:1–2.5:1 under alkaline conditions and in the presence of about 1–10 wt % dicyandiamide and about 1–10 wt % sorbitol based on the total weight of resin solids.

10. The method of claim 9 further comprising adding about 1–10% of an alkylene glycol based on the total weight of resin solids to the resin.

11. The method of claim 10 wherein the alkylene glycol is diethylene glycol.

12. The method of claim 9 wherein the F:M molar ratio is about 1.6:1–1.7:1.

13. The method of claim 9 wherein the melamine is reacted with formaldehyde in the presence of about 1 to 5 wt % sorbitol based on the total weight of resin solids.

14. The method of claim 9 wherein the melamine is reacted with formaldehyde in the presence of about 3 to 5 wt % dicyandiamide based on the total weight of resin solids.

15. The method of claim 10 wherein 1 to 5 wt % alkylene glycol based on the total weight of resin solids is added to the resin.

* * * * *